Dec. 2, 1958  E. E. KOCH  2,862,568
UNIVERSAL INDEXING LINKAGE
Filed Sept. 21, 1956  2 Sheets-Sheet 1

INVENTOR.
EARL E. KOCH
BY
ATTORNEY

Dec. 2, 1958
E. E. KOCH
2,862,568
UNIVERSAL INDEXING LINKAGE
Filed Sept. 21, 1956
2 Sheets-Sheet 2
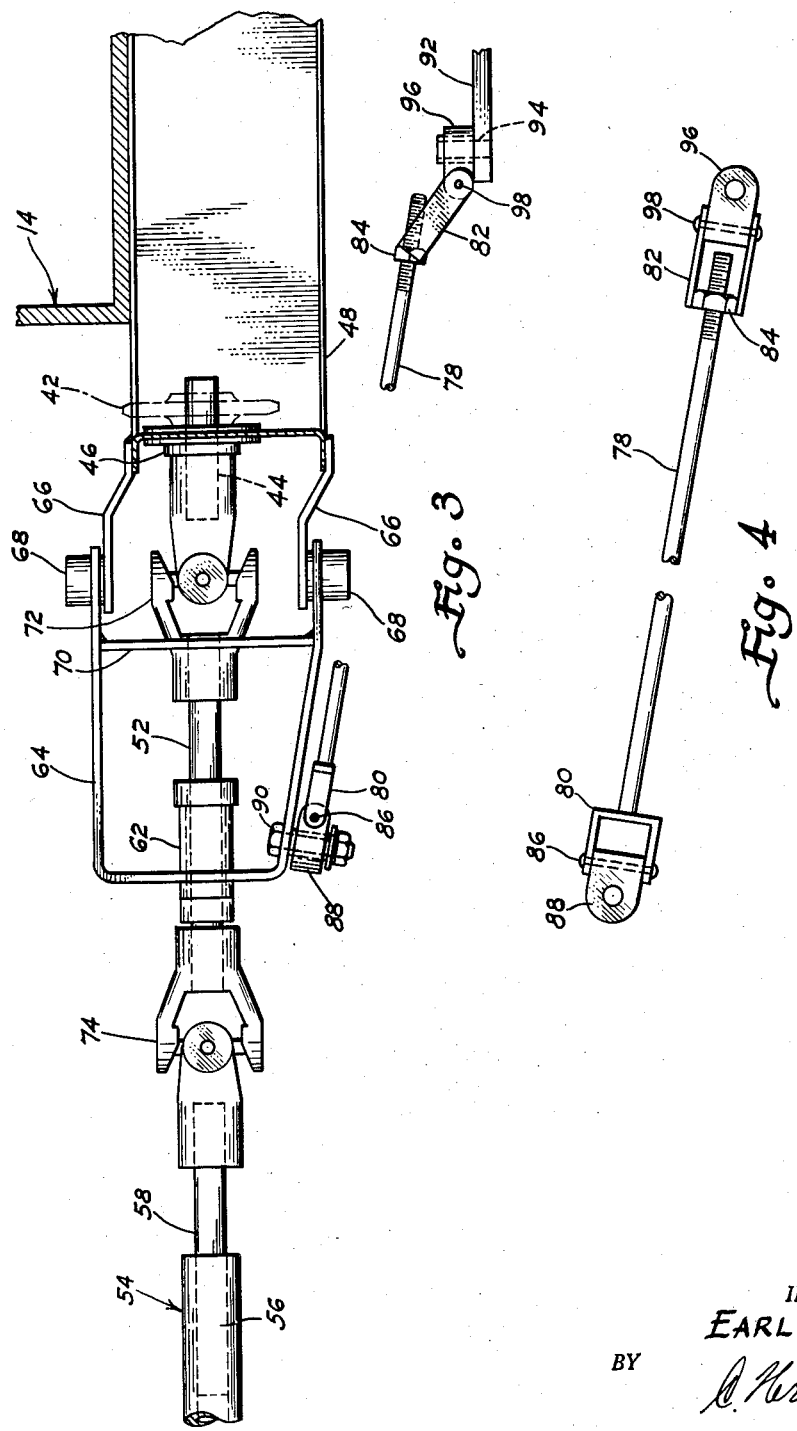
INVENTOR.
EARL E. KOCH
BY
ATTORNEY

United States Patent Office 2,862,568
Patented Dec. 2, 1958

2,862,568

UNIVERSAL INDEXING LINKAGE

Earl E. Koch, Mohnton, Pa., assignor to Sperry Rand Corporation, New Holland, Pa., a corporation of Delaware Application September 21, 1956, Serial No. 611,323

8 Claims. (Cl. 180—14)

This invention relates to an equalizing power transmission assembly for draft vehicles and, more particularly, to a power transmission assembly which is disposed between a tractor unit and a trailer unit such, for example, as a farm tractor and a farm trailer unit which includes a driven shaft for purposes of operating mechanism on the trailer unit. It is to be understood, however, that the specific application of the invention illustrated in the drawings and described hereinafter in the specification is not to be regarded as restrictive inasmuch as the essential features of the invention may be applied to other types of tractor and trailer units.

Many types of trailer units now are employed in industry, as well as on farms, which include apparatus that is operated by a driven shaft carried by the trailer unit. Power is furnished to said driven shaft by a power take-off mechanism provided on modern tractors and especially farm tractors, such power take-off mechanism usually comprising a power shaft projecting from the rear portion of the tractor. A suitable driven shaft projects rearwardly from the tractor and is connected to said power shaft by a suitable universal joint. The rearward end of the driven shaft is likewise connected by a universal joint to the driven shaft of the trailer unit or to some intermediate mechanism by which the driven shaft of the trailer unit is operated. Also, the trailer unit is connected to the tractor unit by a draw bar or tongue projecting from the forward end of the trailer unit.

Particularly in applications of this nature employed in farm equipment, it is found that when the tractor unit makes a sharp turn relative to the trailer unit, the various universal joints are caused to operate at such a relatively sharp angle that the universal joints are subjected to undue wear, and also produce non-uniform rotation of the various shafts connected thereto and especially the shaft on the trailer unit driven thereby. A number of structures have been proposed heretofore for purposes of disposing the various shafts connected by universal joints at somewhat equalized angles so as to minimize these undesirable results described above. However, many of these structures are inefficient or are so involved and cumbersome that use of the same has not been employed widely.

It is the principal object of the present invention to provide an equalizing power transmission assembly for draft vehicles which is simple in construction, relatively inexpensive to construct and install, and functions efficiently to equalize the angles between the various shafts extending from the power take-off shaft of a tractor unit to the driven shaft of a trailer unit, which shafts are interconnected by suitable universal joints. Such equalizing of the angles between the various connected shafts is accomplished by utilizing a portion of the steering mechanism of the trailer unit to control the position of auxiliary means used to support an intermediate shaft preferably carried by the trailer unit. The operation of such mechanism is positive and effectively serves substantially to equalize the angles between said various shafts, regardless of the degree of angularity existing between the longitudinal axes of the tractor and trailer units.

Details of the invention and other objects thereof are set forth in the following specification and illustrated in the accompanying drawings comprising a part thereof.

In the drawings:

Fig. 3 illustrates fragmentarily the details of the essential portion of the invention, on a larger scale than employed in Figs. 1 and 2, this view particularly illustrating the intermediate shafts supported by the forward end of the trailer unit and positioned by mechanism controlled by the steering mechanism of said trailer unit.

Fig. 4 is a plan view illustrating details of a portion of the mechanism shown in Fig. 3.

For purposes of simplifying the illustration of the present invention, an exemplary and conventional farm tractor has been selected to illustrate a tractor unit and a manure spreader has been selected as an exemplary representation of a general class of trailer units which may be connected to the tractor unit so as to be pulled thereby and also have power supplied thereto from the power take-off shaft of the tractor unit so as to operate certain portions of the trailer unit. However, such illustration and description is not to be regarded as restrictive inasmuch as numerous other types of trailer and tractor units may employ the essential characteristics of the present invention.

Figure 1:
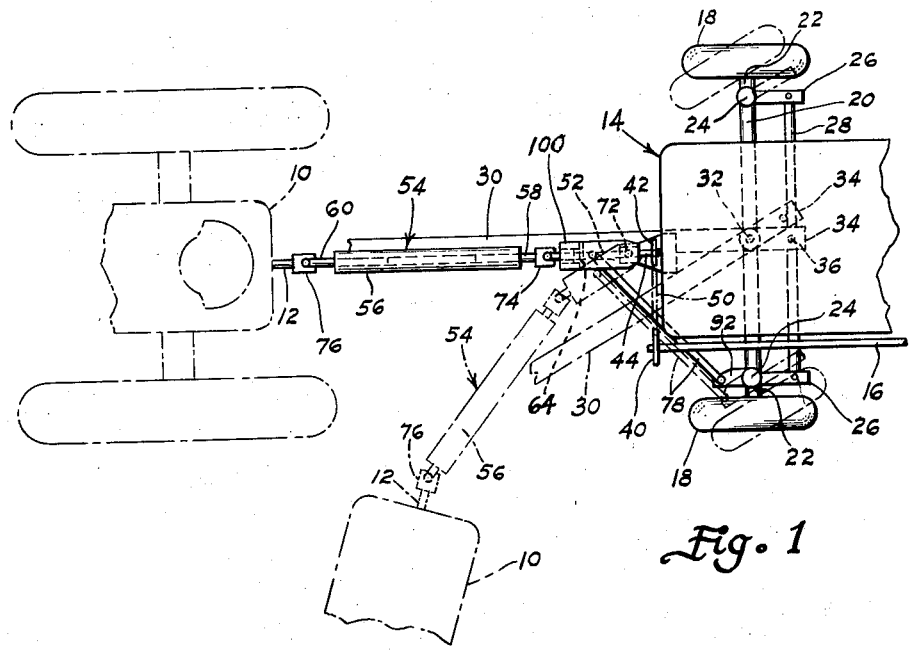
Fig. 1 is an exemplary plan view illustrating fragmentarily portions of tractor and trailer units and also showing in several different relative positions thereof the power transmission assembly, embodying the present invention, which extends between said units.
Figure 2:
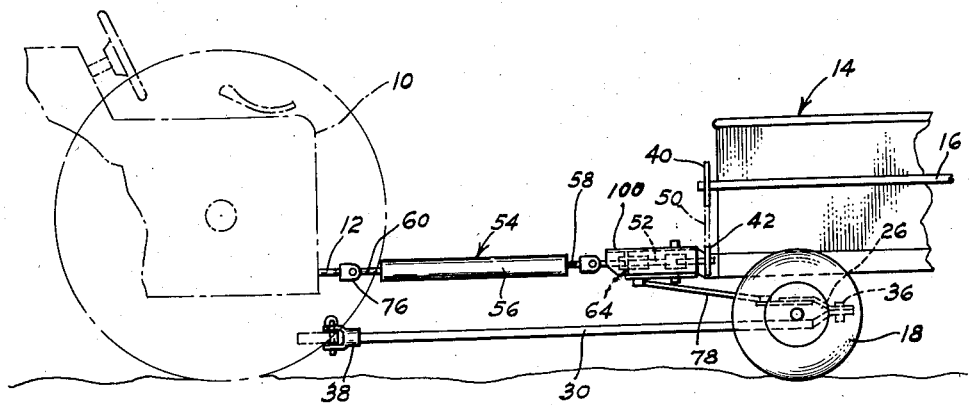
Fig. 2 is a side elevation of the units and mechanism illustrated in Fig. 1.

Referring to the drawings and particularly Figs. 1 and 2, it will be seen that the tractor unit 10 has a rotatable power take-off shaft 12 projecting from the rearward end thereof. The trailer unit 14, comprising an exemplary manure spreader in the specific illustration shown in the drawings, includes a driven shaft 16 rotatably supported by one side of the body of the trailer unit 14. For example, the shaft 16 is connected to the manure distributing mechanism, not shown, which conventionally is carried by the rearward end of the unit 14. Modern manure spreaders also have a slowly moving bed which progressively advances the load to the rear end of the spreader and such advancing mechanism for the bed also may be operated by the driven shaft 16.

The forward end of the trailer unit 14 also is supported by a pair of wheels 18 which are swivelly connected to the opposite ends of a front axle 20 secured firmly to the frame of the unit 14. The wheels 18 are rotatably mounted upon conventional spindles 22 which are rotatably connected to opposite ends of the axle 20 by king pins 24. Steering arms 26 are fixed to and project rearwardly from the spindles 22, the rearward ends of the arms 26 being connected by a tie rod 28. The construction described immediately above is similar to that employed in many types of vehicles such as trucks and automobiles for purposes of supporting the front wheels of the vehicles to permit ready steering of the wheels relative to opposite ends of a front axle supported by the frame of the vehicle.

Trailer unit 14 is provided with draft means such as a tongue 30 pivotally connected adjacent its rearward end to the front axle 20 by a suitable pin 32. The tongue 30 at its rearward end, however, projects beyond the axle 20, said rearward extremity 34 being flexibly connected to tie rod 28 by a pin 36, intermediately of the ends of the tie rod. Accordingly, assuming the forward end of the tongue 30 is connected to the rearward end of the tractor unit 10, such as by a clevis 38 or other type of flexible connection, when the tractor unit 10 is turned in one direction or the other, the trailer unit will follow by causing a turning of the tongue 30, such turning of the tongue also positively turning the wheels 18 about the axes of the respective king pins 24.

Such positive turning of the wheels 18 so as to cause the trailer unit 14 to track behind the tractor unit 10 is utilized effectively to produce the principal desired objective of the present invention, by means now to be described in detail.

As described above, the trailer unit 14 is provided with an exemplary driven shaft 16 which, while shown as being mounted for rotation adjacent one side of the body of the trailer unit 14, may be mounted at any convenient location upon the trailer unit, depending upon the mechanism to be operated thereby. Hence, it will be understood that the present specific illustration is merely exemplary. Also, exemplary power transmission means are illustrated comprising a sprocket gear 40 fixed to the forward end of the shaft 16, a driving sprocket gear 42 fixed to one end of a short driven power shaft 44 rotatably supported within a bearing 46 carried by the forward end of frame 48, for example, of trailer unit 14, and a sprocket chain 50 extends around the sprocket gears 40 and 42.

The power take-off shaft 12 and the short power shaft 44 preferably are interconnected by a plurality of driven intermediate power shafts 52 and 54, the second being longitudinally extensible and contractible. Said second shaft 54 is composite and comprises a sleeve 56 which at one end receives one end of a shaft 58 and the opposite end of the sleeve receives one end of a second shaft 60. One or both of the shafts 58 and 60 is longitudinally but non-rotatably movable relative to the sleeve 56 such as by using suitable complementary geometrical cross-sectional shapes, keys and keyways or the like. In the event only one of the shafts 58 or 60 is longitudinally movable relative to sleeve 56, the other shaft may be fixed, such as by a locking pin, relative to sleeve 56.

The first intermediate shaft 52 is rotatably supported by a bearing 62 fixedly carried by one end of an auxiliary supporting frame 64, as is best seen in Fig. 3. The frame 64 may be substantially U-shaped in side elevation and the rearward end of the opposite legs thereof are pivotally connected respectively to forwardly projecting ears 66 fixed to the forward portion of frame 48 of the trailer unit. Any suitable type of pintles or trunnions 68 may be used to connect the frame 64 to the ears 66. Also, if desired, a strut 70, see Fig. 3, may be used to brace the opposite legs of the U-shaped frame 64.

The rearward end of first intermediate shaft 52 is connected flexibly to the driven power shaft 44 by a diagrammatically illustrated universal joint 72, and the forward end of shaft 52 is connected flexibly to shaft 58 of the composite second intermediate shaft 54 by a second universal joint 74 diagrammatically illustrated. Further, the forward end of the second shaft 60 of the composite second intermediate shaft 54 is connected flexibly to the rearward end of power take-off shaft 12 by means such as a third universal joint 76. Hence, it will be seen that while the tractor unit 10 is connected for draft purposes to the trailer unit 14 by a single tongue 30, the driven shaft 16 of the trailer unit is connected to the power take-off shaft 12 of the tractor unit by a plurality of shafts interconnected flexibly by universal joints. Also, inasmuch as a plurality of shafts are used to connect the driving and driven means of the respective units, it will be necessary for at least one of said shafts to be extensible and contractible longitudinally and the composite intermediate shaft 54 is provided for that purpose.

From Fig. 1, it will be seen that the tractor unit 10 may assume various positions of angularity relative to the longitudinal axis of the trailer unit 14 from substantially axial alignment therewith to a relatively sharp angle thereto. Particularly in the latter relative positions of the units, it is desirable that the single angle between the axes of the two units be distributed substantially equally between the several intermediate shafts 52 and 54, whereby substantially equal angular arrangements will be sustained by the three universal joints 72, 74 and 76. This results in transferring the uniform rotation of power take-off shaft 12 as constantly as possible to the driven shaft 16, for example, of the trailer unit 14.

In order that the equalizing of the angles between the power take-off shaft 12, the intermediate shafts 52 and 54, and the short power shaft 44 may be effected positively, the auxiliary supporting frame 64 is interconnected to the steering mechanism of the trailer unit 14 by means of a bar 78. The opposite ends of bar 78 are connected respectively to the frame 64 and the steering mechanism preferably by any suitable flexible means such as a clevis 80 fixed to one end of bar 78 and a second clevis 82 fixed to the opposite end of bar 78 which is threaded to engage a nut 84 comprising part of clevis 82. Hence, the effective length of bar 78 is adjustable. Clevis 80 is connected by a pivot pin 86 to a bearing member 88 surrounding a connecting pintle 90 which may comprise a suitable bolt such as clearly shown in Fig. 3. In effect, the bearing 88 and clevis 80 comprise a universal joint.

Projecting preferably forwardly from and fixed relative to one of the steering arms 26 is an actuating arm 92 which is rotatable with the arm 26 about the axis of the king pin 24 therefor. Any suitable flexible connection may be made between the forward end of actuating arm 92 and the rearward end of bar 78 such as by the use of a pintle 94 carried by arm 92 and surrounded by bearing member 96 which is pivotally connected by a pin 98 to clevis 82, thereby providing somewhat of a universal joint between the bar 78 and arm 92.

Under most circumstances, it is found that the arm 92 should preferably be substantially as long, or possibly slightly shorter than the steering arm 26 to which it is relatively fixed. Hence, the pivotal movement of the wheels effects movement of the actuating arm 92 and thereby positively moves the auxiliary supporting frame 64 substantially directly with the pivotal movement of the wheels 18 to effect preferably substantial equalizing of the angles between the various shafts 12, 54, 52 and 44 and the universal joints interconnecting the same. The adjustability of the length of the bar 78 to effect desired positioning of the bearing members 88 and 96 relative to each other will provide precise desired movement of the frame 64 and the intermediate power shaft 52 carried thereby to effect substantially equal angles between the aforementioned shafts.

From the foregoing, it will be seen that the angle-equalizing mechanism described above and illustrated in the drawings provides a simple, yet positive and relatively inexpensive means to accomplish the objects of the invention by utilizing the steering mechanism of the trailer unit positively to position the auxiliary supporting frame 64 and the intermediate power shaft 52 serves to control the angularity of the composite intermediate shaft 54 relative thereto, as well as the angularity of the power take-off shaft 12 and driven power shaft 44 respectively relative to the composite second intermediate shaft 54 and the first intermediate shaft 52. The mechanism is effective to operate as intended regardless of the degree of angularity between the longitudinal axes of the tractor unit 10 and the trailer unit 14. Further, the equalizing mechanism is exposed so as either to be adjusted or repaired. The various universal joints and bearings also are so arranged as readily to be lubricated, and the entire mechanism is substantially foolproof.

A protecting hood 100 is detachably fixed to auxiliary supporting frame 64 to cover the mechanism carried thereby as clearly shown in Figs. 1 and 2. Hood 100 may be U-shaped in cross-section and is removed in Fig. 3 to afford a clearer view of the details shown therein.

While the invention has been described and illustrated in its preferred embodiment, and has included certain details, it should be understood that the invention is not to be limited to the precise details herein illustrated and described since the same may be carried out in other ways falling within the scope of the invention as claimed.

I claim:

1. An assembly operable to transmit power from the power take-off shaft of a tractor unit to the driven shaft of a trailer unit having steering mechanism for the front wheels thereof and flexibly connected to said tractor unit by draft means permitting angular relationship between said units from longitudinal alignment to a sharp angle, said assembly comprising in combination, a power shaft connected at its rearward end by a first universal joint to the forward end of the driven shaft of said trailer unit, a supporting member pivotally connected for movement about a vertical axis to the forward end of said trailer unit and supporting said shaft for axial rotation, an axially rotatable driving member, a second universal joint connecting the forward end of said power shaft adjacent the forward end of said supporting member to the rearward end of said axially rotatable driving member, a third universal member, a third universal joint connecting the forward end of said driving member to the power take-off shaft of the tractor unit, and means connected between said supporting member and the steering mechanism of said trailer unit and operable to move said supporting member and power shaft angularly relative to said trailer unit substantially less than the angle between the longitudinal axes of said tractor and trailer units, thereby substantially evenly distributing the latter angle between said three universal joints.

2. An assembly operable to transmit power from the power take-off shaft of a tractor unit to the driven shaft of a trailer unit having steering mechanism for the front wheels thereof including steering rod arms and flexibly connected to said tractor unit by draft means permitting angular relationship between said units from longitudinal alignment to a sharp angle, said assembly comprising in combination, a relatively short power shaft connected at its rearward end by a first universal joint to the forward end of the driven shaft of said trailer unit, a short supporting member pivotally connected for movement about a vertical axis to the forward end of said trailer unit and supporting said shaft for axial rotation, an axially rotatable driving member, a second universal joint connecting the forward end of said power shaft adjacent the forward end of said supporting member to the rearward end of said axially rotatable driving member, a third universal joint connecting the forward end of said driving member to the power take-off shaft of the tractor unit, and means connected between said supporting member and means movable with one of the steering arms of the steering mechanism of said trailer unit and operable to move said supporting member and power shaft angularly relative to said trailer unit substantially less than the angle between the longitudinal axes of said tractor and trailer units, thereby substantially evenly distributing the latter angle between said three universal joints.

3. An assembly operable to transmit power from the power take-off shaft of a tractor unit to the driven shaft of a trailer unit having steering mechanism for the front wheels thereof including steering rod arms and flexibly connected to said tractor unit by draft means permitting angular relationship between said units from longitudinal alignment to a sharp angle, said assembly comprising in combination, a relatively short power shaft connected at its rearward end by a first universal joint to the forward end of the driven shaft of said trailer unit, a short supporting member pivotally connected for movement about a vertical axis to the forward end of said trailer unit and supporting said shaft for axial rotation, an axially rotatable driving member, a second universal joint connecting the forward end of said power shaft adjacent the forward end of said supporting member to the rearward end of said axially rotatable driving member, a third universal joint connecting the forward end of said driving member to the power take-off shaft of the tractor unit, an actuating arm fixed relative to one of the steering rod arms of said steering mechanism, and elongated bar means connected between said supporting member and said actuating arm and operable to move said supporting member and power shaft angularly relative to said trailer unit substantially less than the angle between the longitudinal axes of said tractor and trailer units, thereby substantially evenly distributing the latter angle between said three universal joints.

4. An equalizing power transmission assembly connectable to the rotatable power take-off shaft of a tractor unit and comprising in combination, a trailer unit having steering mechanism for the front wheels thereof and draft means connectable to the trailing end of said tractor unit, a power shaft supported by said trailer unit for axial rotation, a first intermediate shaft rotatably supported by and projecting from the front end of said trailer unit, a universal joint interconnecting said intermediate shaft and the power shaft of said trailer unit, a second intermediate shaft extending from said first intermediate shaft and flexibly connectable to the power take-off shaft of the tractor unit, a second universal joint interconnecting said first and second intermediate shafts, and means interconnecting said first intermediate shaft and said steering mechanism and responsive to the angular position of the front wheels of the trailer unit to dispose said first intermediate shaft in a similar angular direction to the trailer unit as the angular direction of the draft means thereto, whereby substantially even angles exist between said power shaft and two intermediate shafts at substantially all angular relationships between said tractor and trailer units.

5. An equalizing power transmission assembly connectable to the rotatable power take-off shaft of a tractor unit and comprising in combination, a trailer unit having steering mechanism for the front wheels thereof and draft means connectable to the trailing end of said tractor unit, a power shaft supported by said trailer unit for axial rotation, a first intermediate shaft rotatably supported by and projecting from the front end of said trailer unit, a universal joint interconnecting said first intermediate shaft and the power shaft of said trailer unit, a second intermediate shaft extending from the forward end of said first intermediate shaft and flexibly connectable to the power take-off shaft of the tractor unit, a second universal joint interconnecting said first and second intermediate shafts, and means interconnected between said first intermediate shaft and the steering mechanism of said trailer unit and responsive to the angular position of the front wheels thereof to dispose said first intermediate shaft in a similar angular direction to the trailer unit as the angular direction of the draft means thereto, whereby substantially even angles exist between said power shaft and two intermediate shafts at substantially all angular relationships between said tractor and trailer units.

6. An assembly operable to transmit power from the power take-off shaft of a tractor unit to a trailer unit having a driven shaft and steering mechanism for the front wheels of the trailer unit and flexibly connected to said tractor unit by draft means permitting various angular relationships between said units from longitudinal alignment to a sharp angle, said assembly comprising in combination, a power shaft projecting forwardly from the trailer unit, means interconnecting said power shaft of said unit to the driven shaft thereof, a first intermediate driving shaft connected to the forward end of said power shaft by a universal joint, a second intermediate shaft forwardly of said first intermediate shaft, a universal joint connecting the forward end of said first intermediate shaft to the rearward end of said second intermediate shaft, the forward end of said second intermediate shaft being connectable flexibly to the power take-off shaft of said trailer unit, and angle distributing and equalizing means interconnected between said first intermediate shaft and the steering mechanism of said trailer unit and operable in response to the various angular positions of the forward wheels of said trailer unit to the longitudinal axis of said unit to position said intermediate shafts and power shaft at substantially even angles to each other, thereby subjecting the several universal joints to substantially even angles.

7. An assembly operable to transmit power from the power take-off shaft of a tractor unit to a trailer unit having a driven shaft and steering mechanism for the front wheels of the trailer unit and flexibly connected to said tractor unit by draft means permitting various angular relationships between said units from longitudinal alignment to a sharp angle, said assembly comprising in combination, a power shaft projecting forwardly from the trailer unit, means interconnecting said power shaft of said unit to the driven shaft thereof, a first intermediate driving shaft connected to the forward end of said power shaft by a universal joint, a second intermediate shaft forwardly of said first intermediate shaft, a universal joint connecting the forward end of said first intermediate shaft to the rearward end of said second intermediate shaft, the forward end of said second intermediate shaft being connectable flexibly by another universal joint to the power take-off shaft of said trailer unit, an actuating arm connected to and projecting from the steering mechanism of the trailer unit, and an angle distributing member interconnected between said first intermediate shaft and actuating arm on said steering mechanism of said trailer unit and operable in response to the various angular positions of the forward wheels of said trailer unit to the longitudnial axis of said unit to position said intermediate shafts and power shaft at substantially even angles to each other, thereby subjecting the several universal joints to substantially even angles.

8. An equalizing power transmission assembly connectable to the rotatable power take-off shaft of a tractor unit and comprising in combination, a trailer unit having steering mechanism for the front wheels thereof and draft means connectable to trailing end of said tractor unit, a power shaft supported by said trailer unit for axial rotation, a first intermediate shaft rotatably supported by and projecting from the front end of said trailer unit, means flexibly interconnecting said first intermediate shaft and the power shaft of said trailer unit, a second intermediate shaft extending between said first intermediate shaft and the power take-off shaft of the tractor unit and flexibly connectable to the latter, additional flexible means interconnecting said first and second intermediate shafts, and elongated means interconnected between said first intermediate shaft and the steering mechanism of said trailer unit and responsive to the angular position of the front wheels of the trailer unit to dispose said intermediate shafts and power shaft at similar angular positions relative to each other at substantially all angular relationships between said tractor and trailer units.

References Cited in the file of this patent

UNITED STATES PATENTS

| | | |
|---|---|---|
| 1,207,663 | Thomason | Dec. 5, 1916 |
| 1,646,455 | Johnson et al. | Oct. 25, 1927 |
| 1,698,724 | Johnston et al. | Jan. 25, 1929 |
| 1,935,811 | Metcalf | Nov. 21, 1933 |
| 2,427,824 | Vutz | Sept. 23, 1947 |